United States Patent [19]

Blasko et al.

[11] 4,240,838

[45] Dec. 23, 1980

[54] PIGMENTARY HARDENER-CONTAINING CURABLE SILICATE COMPOSITIONS

[75] Inventors: John E. Blasko; William G. Boberski, both of Gibsonia; Jerome A. Seiner, Pittsburgh, all of Pa.

[73] Assignee: PPG Industries, Inc., Pittsburgh, Pa.

[21] Appl. No.: 12,269

[22] Filed: Feb. 15, 1979

[51] Int. Cl.$^3$ .................. C09D 1/02; C09D 1/04; B05D 3/02

[52] U.S. Cl. ..................... 106/84; 427/397.8

[58] Field of Search ............ 106/74, 84; 427/372 R, 427/327 B, 397.8

[56] References Cited

U.S. PATENT DOCUMENTS

| | | | |
|---|---|---|---|
| 992,355 | 5/1911 | Herisson | 106/74 X |
| 3,505,086 | 4/1970 | Freyhold | 106/1 |
| 3,656,977 | 4/1972 | Dreyling et al. | 106/84 X |
| 3,669,699 | 7/1972 | Doi et al. | 106/74 |
| 3,715,224 | 2/1973 | Campbell | 106/84 X |
| 3,793,055 | 2/1974 | Shodai et al. | 106/74 X |
| 3,951,673 | 4/1976 | Isohata et al. | 106/84 |
| 4,036,655 | 7/1977 | Yamada et al. | 106/77 |
| 4,072,533 | 2/1978 | Barrall et al. | 106/84 |
| 4,125,651 | 11/1978 | Campbell et al. | 427/372 B |

*Primary Examiner*—Michael R. Lusignan
*Attorney, Agent, or Firm*—Charles R. Wilson

[57] ABSTRACT

This invention relates to pigmentary hardener-containing curable silicate compositions having improved water resistance, wherein the pigmentary hardener has the formula $M_xM_y'O_z$ where M is a divalent or trivalent metal ion, M' is an ion of a metal from Groups III, IV or VIB of the Periodic Table of Elements, provided M and M' are not the same metal ion, x is 1 or 2, y is 1, 2 or 3 and z is an integer the value of which satisfies the oxidation state of the pigmentary hardener.

10 Claims, No Drawings

PIGMENTARY HARDENER-CONTAINING CURABLE SILICATE COMPOSITIONS

BACKGROUND OF THE INVENTION

During the past several years, environmental pollution concerns have led those active in the coatings, castings and moldings arts to develop various curable compositions in which organic solvents derived from petroleum have been eliminated or at least substantially minimized. Thus, compositions such as water-based compositions and high solids compositions have been extensively investigated. Even more recently the petroleum embargo and the resultant high cost and scarcity of petroleum by-products has engendered interest in the development of curable compositions which are composed entirely of, or at least substantially of, inorganic components.

A number of water-soluble or water-dispersible silicate compounds are known in the art. Such compounds include sodium silicates, potassium silicates, lithium silicates and quaternary ammonium silicates which readily dissolve or disperse in water. When such water-soluble or -dispersible silicates are blended with insolubilizing agent (i.e. crosslinkers), quite often the resultant solution is very unstable. Thus, there have been developed latent metal ion containing insolubilizing agents so that useful one-package coating compositions could be formed.

BRIEF DESCRIPTION OF THE INVENTION

The present invention relates to curable coating, casting and molding compositions composed essentially of inorganic constituents. More particularly, the present invention relates to curable compositions comprising aqueous solutions or colloidal dispersions of silicates containing a pigmentary hardener corresponding to the formula $M_xM_y'O_z$ where M is a divalent or trivalent metal ion, M' is an ion of a metal from Groups III, IV or VIB of the Periodic Table of Elements, provided M and M' are not the same metal ion, x is 1 or 2, y is 1, 2 or 3 z is an integer the value of which satisfies the oxidation state of the pigmentary hardener. It has been found the pigmentary hardener-containing compositions of the invention cure more rapidly and/or more completely and have better resistance to color change upon water soak than similar compositions not containing the pigmentary hardener.

DETAILED DESCRIPTION OF THE INVENTION

This invention is concerned with the discovery that the presence of a particulate pigmentary hardener improves the cured film properties of curable compositions composed essentially or substantially of inorganic constituents comprising water-soluble or -dispersible silicates and, optionally, metal ion containing latent insolubilizers.

The pigmentary hardener has the formula $M_xM_y'O_z$ where M is a divalent or trivalent metal ion, M' is an ion of a metal from Groups III, IV or VIB of the Periodic Table of Elements, provided M and M' are not the same metal ion, x is 1 or 2, y is 1, 2 or 3 and z is an integer the value of which satisfies the oxidation state of the pigmentary hardener. Preferably M is selected from the group consisting of magnesium, calcium, strontium, barium, zinc, aluminum and ferric iron. Preferably M' is selected from the group consisting of boron, aluminum, silicon, tin, titanium, zirconium, chromium and molybdenum.

Examples of useful pigmentary hardeners include barium metaborate, magnesium borate, calcium borate, magnesium aluminate, calcium aluminate, barium aluminate, calcium silicate, zinc borate, zinc titanate, calcium molybdate, strontium chromate, zinc molybdate, aluminum borate and ferric borate. The presently preferred compounds are barium metaborate, calcium borate, calcium silicate, and aluminum borate with barium metaborate being especially preferred. The pigmentary hardener may also be employed as a hydrate, or as a surface treated material as is conventional in the pigment art.

Water-soluble or -dispersible silicates which are employed in the compositions herein are the alkali metal or quaternary ammonium silicates, e.g., sodium silicates, potassium silicates, lithium silicates and quaternary ammonium silicates. Preferred water-soluble silicates are potassium silicates.

The amount of pigmentary hardener employed is a cure enhancing amount, usually between about 1 part and about 300 parts by weight and preferably between about 15 parts and about 100 parts by weight based upon 100 parts by weight of silicate solids. Where the pigmentary hardener is employed in a one package system the pigmentary hardener is employed in an amount which enhances cure does not cause rapid package instability. Where two package systems are contemplated the amount of pigmentary hardener can be any cure enhancing amount which allows time for mixing, and use of the composition before gelation.

The pigmentary hardeners of the invention are employed as the sole or primary cure or hardening promoters in the system, or they are employed in conjunction with other cure agents such as latent metal ion containing insolubilizing agents to either allow reduction of the amount of the other insolubilizing agent employed, or to enhance the final cured properties of the composition.

One curable system which can be enhanced by the presence of the pigmentary hardeners is the system described in U.S. Pat. No. 3,715,224, to Campbell, which is hereby incorporated by reference in its entirety. Campbell discloses solutions and/or colloidal suspensions of water-soluble silicates containing monovalent or divalent metal ion complexes.

Other systems enhanced by the use of the pigmentary hardeners are the systems described in copending applications Ser. No. 868,566, now U.S. Pat. No. 4,140,535 patented Feb. 10, 1979, Ser. No. 868,567, now U.S. Pat. No. 4,169,735, patented Oct. 2, 1979, and Ser. No. 868,570, now abandoned, all filed Jan. 10, 1978, which are hereby incorporated by reference in their entirety. These systems comprise a blend of silicates and a metallate latent insolubilizer where the latent insolubilizer is selected from alkali metal or quarternary ammonium zincates, aluminates and borates. Alkali metal aluminates, especially sodium aluminate, are preferred insolubilizing agents.

Yet another system enhanced by the use of the pigmentary hardener is the system described in U.S. Pat. No. 4,137,087, issued Jan. 30, 1979, which is incorporated by reference in its entirety. The system comprises a blend of silicates and a latent insolubilizing agent formed from metal ions selected from the group consisting of $Al^{+++}$, $Fe^{+++}$, $Cr^{+++}$, and $Sn^{++}$ and ligands (i.e., complexing agents) selected from the group consisting of ethylenediaminetetraacetate, diethylenetriaminepentaacetate, N-(hydroxyethyl) ethylenediaminetetraacetate, nitrilotriacetate and 1,3-propanediaminetetraacetate. It should be noted that other similar or analogous type ligands where they exist may be employed and these are considered to be within the scope of the invention.

When employed, the amount of latent insolubilizers included in the compositions herein can vary considerably depending upon desired properties. However, in general, where a one package system is desired, the amount of metallate latent insolubilizer employed is an amount sufficient to enhance wet abrasion and water resistance of the cured composition but which is insufficient to cause rapid package instability (gel or hardening in less than about one month at room temperature) in the uncured composition. In most instances, amounts of metallate latent insolubilizers employed range from about 0.1 percent to about 5.0 percent, preferably about 0.25 percent to about 2.0 percent by weight, based upon the combined weight of the silicate and metallate latent insolubilizer solids. Where two package systems are employed, higher amounts of the insolubilizer or other known insolubilizers may be employed.

While the addition of the pigmentary hardeners to any of the water-soluble or water-dispersible silicates compositions described above provide enhanced curing of those compositions, the preferred compositions are those which contain conventional amounts of commonly employed hiding, extender and/or coloring pigments. The invention is particularly useful when the composition contains one or more organic or inorganic coloring pigments which impart color particularly a pastel, bright, or intense color. Useful coloring pigments include iron oxide red, barium yellow, zinc yellow, zinc green, cadmium yellow, chrome oxide green, cobalt blue, green or violet, various mixed metal oxides and organic pigments of the azo series. The pigments are employed as dispersed pulverulent solids. Mixture of pigments can and generally are employed. Generally, the pigments, (including pigmentary hardener and the coloring pigments of this paragraph) when present, are present in an amount of about 5 to about 90 and preferably about 30 to 70 based upon the total volume of solids in the composition.

In addition to the water-soluble silicate and metallate latent insolubilizer, the pigmented curable compositions of the invention can contain certain other additives such as, for example, dyes, antioxidants, flow control agents, surfactants, thickeners, and the like, depending on the intended use of the compositions.

The compositions are water borne and while the amount of water can vary widely depending on intended use, for coating compositions, generally, the compositions comprise between about 10 and about 95 percent water based on the weight of the total composition.

As mentioned above, the curable compositions of the invention can be employed in various applications such as for coatings. The compositions are particularly useful in coatings over a variety of substrates such as metals, glass, wallboard, wood, plastic, carbon, cementitious substrates and the like. The compositions can also be used, preferably at relatively high solids, as molding compositions.

The curable coatings compositions herein can be applied by any conventional method, including brushing, dipping, rolling, flow coating, roll coating, spraying and the like. Conventional spray techniques and equipment can be utilized.

Curable compositions of the invention can be cured by baking at moderate or elevated temperatures if desired. However, one advantageous property of these curable compositions is that they can be cured by drying them in air at ambient temperature without the use of heat. As will be evident, ambient temperature curable compositions are of considerable advantage in that they provide for significant energy savings in comparison to compositions which require elevated temperatures for curing.

The following examples are submitted for the purpose of further illustrating the nature of the present invention and should not be construed as a limitation on the scope thereof. All parts and percentages in the examples and throughout the specification are by weight unless otherwise indicated.

In the following examples the cure of silicate coatings was measured in two ways. First, films are prepared and allowed to air dry for a period of 3-10 days. The films were submerged in water for 1 hour. Following this soak they were immediately rubbed with a wet cloth. The number of double rubs (up to 200) required for failure is an indication of the degree of cure. In this regard, it should be noted variations in humidity during cure can lead to variability in results. Therefore, in the following examples, comparisons of examples within each test grouping are valid while cross-comparisons involving separate groupings cured under different conditions, i.e., humidity may not be valid.

For films which pass the double rub test, another method is also available. This second method measures the difference in color between the soaked and unsoaked areas of the coating. In some cases, a comparative color change value was determined from the light reflectances of the two areas measured at an appropriate wavelength. These reflectances are conveniently converted to the modified Kubelka-Monk (K/S) value which can be determined from the equation $$\frac{K}{S} = \left[ \frac{(1-R)^2}{2R} \right]^{1.125}$$

where R is the reflectance at the wavelength of interest. The color change value is then determined from the equation $$\text{Color change value} = \frac{(\frac{K}{S}) \text{ unsoaked}}{(\frac{K}{S}) \text{ soaked}} \times 100\%$$

For a system having reflectances of 69 percent in the unsoaked region and 80 percent in the soaked region the calculations are:

$$(\frac{K}{S}) \text{ unsoaked} = \left[ \frac{(1-0.69)^2}{2(0.69)} \right]^{1.125} = 0.0499$$

$$(\frac{K}{S}) \text{ soaked} = \left[ \frac{(1-0.80)^2}{2(0.08)} \right]^{1.125} = 0.0158$$

$$\text{Color change value} = \frac{0.0499}{0.0158} \times 100\%$$

$$= 316 \text{ percent}$$

This color change is most valid when comparing similar systems. Care should be taken to use this method only when coatings of similar composition and color are to be compared.

EXAMPLES 1-15

Coating compositions were prepared as indicated below with Example 2 representing a preferred embodiment.

draw bar. After curing at ambient temperatures for the allotted number of days, each series of panels were evaluated for abrasion resistance by soaking the films in tap water for one hour and rubbing the film with a finger inside a wet cloth until the film wears through. The result was recorded as the number of strokes (double finger rubs) needed to break the film.

The light reflectance was measured on dried panels at 560 m$\mu$ before and after soak, in the manner described above.

| | Parts by Weight | | | | | | | | | | |
|---|---|---|---|---|---|---|---|---|---|---|---|
| | Ex. No. | | | | | | | | | | |
| Ingredients | 1 | 2 | 3 | 4 | 5 | 6 | 7 | 8 | 9 | 10 | 11 |
| Water | 53.0 | 53.0 | 53.0 | 53.0 | 53.0 | 53.0 | 53.0 | 53.0 | 53.0 | 27.0 | 53.0 |
| Sodium aluminate | 0.57 | 0.57 | 0.57 | 0.57 | 0.57 | 0.57 | 0.57 | 0.57 | 0.57 | 0.28 | 0.57 |
| The above were mixed and there was then added: | | | | | | | | | | | |
| Surfactant (1) | 0.6 | 0.6 | 0.6 | 0.6 | 0.6 | 0.6 | 0.6 | 0.6 | 0.6 | 0.3 | 0.6 |
| Citric acid | 0.4 | 0.4 | 0.4 | 0.4 | 0.4 | 0.4 | 0.4 | 0.4 | 0.4 | 0.2 | 0.4 |
| Aminomethylpropanol | 1.0 | 1.0 | 1.0 | 1.0 | 1.0 | 1.0 | 1.0 | 1.0 | 1.0 | 0.5 | 1.0 |
| Non-ionoic surfactant (2) | 4.2 | 4.2 | 4.2 | 4.2 | 4.2 | 4.2 | 4.2 | 4.2 | 4.2 | 2.1 | 4.2 |
| Silicone defoamer (3) | 1.0 | 1.0 | 1.0 | 1.0 | 1.0 | 1.0 | 1.0 | 1.0 | 1.0 | 0.5 | 1.0 |
| After mixing there was added: | | | | | | | | | | | |
| $TiO_2$ (4) | 98.0 | 62.0 | 62.0 | 62.0 | 82.0 | 62.0 | 62.0 | 62.0 | 62.0 | 31.0 | 62.0 |
| Green pigment (5) | 12.8 | 8.0 | 10.6 | 8.0 | 8.0 | 10.6 | 8.0 | 8.0 | 8.0 | 4.0 | 8.0 |
| Barium metaborate (6) | — | 33.0 | — | — | — | — | — | — | — | — | — |
| Calcium borate (7) | — | — | 95.0 | — | — | — | — | — | — | — | — |
| Magnesium aluminate (8) | — | — | — | 36.0 | — | — | — | — | — | — | — |
| Calcium aluminate (8) | — | — | — | — | 30.0 | — | — | — | — | — | — |
| Barium aluminate (8) | — | — | — | — | — | 15.0 | — | — | — | — | — |
| Calcium silicate (9) | — | — | — | — | — | — | 25.0 | — | — | — | — |
| Zinc titanate (7) | — | — | — | — | — | — | — | 33.0 | — | — | — |
| Calcium molybdate (10) | — | — | — | — | — | — | — | — | 44.0 | — | — |
| Strontium chromate (7) | — | — | — | — | — | — | — | — | — | 16.0 | — |
| Aluminum borate (8) | — | — | — | — | — | — | — | — | — | — | 33.0 |
| Carboxymethyl cellulose | 2.0 | 2.0 | 2.0 | 2.0 | 2.0 | 2.0 | 2.0 | 2.0 | 2.0 | 1.0 | 2.0 |
| Water | — | — | — | — | — | — | 50.0 | — | — | — | — |
| The resultant mixture was ground in a pigment dispersing apparatus. There was then slowly added to the grind: | | | | | | | | | | | |
| Potassium silicate solution (11) (29% solution of 3.93 molar $SiO_2/K_2O$) | 350.0 | 350.0 | 350.0 | 350.0 | 350.0 | 350.0 | 350.0 | 350.0 | 350.0 | 175.0 | 350.0 |
| Where appropriate, there was then premixed and added to the above the following: | | | | | | | | | | | |
| Mica (12) | 76.0 | 76.0 | 76.0 | 76.0 | 76.0 | 76.0 | 76.0 | 76.0 | 76.0 | 38.0 | 76.0 |
| Magnesium aluminosilicate (13) | 10.0 | 10.0 | 10.0 | 10.0 | 10.0 | 10.0 | 10.0 | 10.0 | 10.0 | 5.0 | 10.0 |
| The resultant mixtures were dispersed for 10 minutes with a Cowles Dissolver. | | | | | | | | | | | |

(1) Available from Rohm & Haas Co. as Triton X45.
(2) Available from Wyandotte Chemicals as Tetronic 304.
(3) Available from SWS Div. of Stauffer Chemical Co. as SWS 214.
(4) Available from National Lead Co. as Titanox 2060.
(5) Available from Shepard Co. as Shepard Green #5.
(6) Available from Buckman Laboratories as Busan 11M1.
(7) Available from Pfaltz & Bauer.
(8) Available from Research Organic/Inorganic Chem. Co.
(9) Available from PPG Industries, Inc. as Hi-Sil 422.
(10) Available from Climax Molybdenum Co.
(11) Available from Philadelphia Quartz Co. as Kasil No. 1.
(12) Available from U.S. Mica Co. as Micromica C1000.
(13) Available from Minerals & Chemicals Philips Co. as Attagel 40.

Two series of coated glass panels were formed by drawing down the compositions on glass with a 3 mil

| Film of Ex. No. | 1 | 2 | 3 | 4 | 5 | 6 | 7 | 8 | 9 | 10 | 11 |
|---|---|---|---|---|---|---|---|---|---|---|---|
| 3 day cure at room temperature | | | | | | | | | | | |

-continued

| Film of Ex. No. | 1 | 2 | 3 | 4 | 5 | 6 | 7 | 8 | 9 | 10 | 11 |
|---|---|---|---|---|---|---|---|---|---|---|---|
| Double finger rubs | 0 | 3 | 25 | 0 | 20 | 29 | >200 | 12 | >200 | >200 | >200 |
| Light Reflectance | | | | | | | | | | | |
| before soak | 68.03 | 70.22 | 75.49 | 70.64 | 71.07 | 72.95 | 77.23 | 70.33 | 72.27 | 62.10 | 79.99 |
| after soak | 71.74 | 72.74 | 77.63 | 72.18 | 79.63 | 80.98 | 81.81 | 79.57 | 78.23 | 73.95 | 79.64 |
| color change value | 140% | 127% | 123% | 116% | 249% | 248% | 177% | 268% | 187% | 284% | 136% |
| 5 day cure at room temperature | | | | | | | | | | | |
| Double finger rubs | >200 | >200 | >200 | >200 | >200 | >200 | >200 | >200 | >200 | >200 | >200 |
| Light reflectance | | | | | | | | | | | |
| before soak | 69.31 | 72.02 | 78.47 | 71.03 | 71.68 | 73.69 | 77.20 | 70.80 | 72.97 | 63.53 | 77.87 |
| after soak | 79.93 | 76.58 | 80.56 | 80.57 | 79.18 | 80.44 | 80.61 | 76.11 | 77.81 | 71.92 | 80.74 |
| color change value | 304% | 160% | 130% | 285% | 224% | 214% | 151% | 170% | 167% | 207% | 141% |

It is noted that the five day light reflectance results are more meaningful since the films were substantially cured.

EXAMPLES 12-15

In the manner of the previous Examples, coating compositions, with and without barium metaborate, were prepared from the following ingredients:

| | | Parts by Weight | | | |
|---|---|---|---|---|---|
| Ingredients | Ex. No. | 12 | 13 | 14 | 15 |
| Water | | 76.0 | 76.0 | 111.0 | 111.0 |
| Potassium hydroxide | | 0.5 | 0.5 | 0.5 | 0.5 |
| $TiO_2$* | | 62.0 | 98.0 | 62.0 | 98.0 |
| Barium metaborate* | | 33.0 | — | 33.0 | — |
| Green pigment* | | 8.0 | 12.8 | 8.0 | 12.8 |
| Potassium silicate solution ($SiO_2:K_2O$)mole ratio of 3.93:1-29.1% wt. solids)* | | 350.0 | 350.0 | — | — |
| Sodium silicate solution ($SiO_2:Na_2O$ mole ratio of 3.22:1-38.3 wt% solids) | | — | — | 317.0 | 317.0 |
| Mica* | | 76.0 | 76.0 | 76.0 | 76.0 |
| Magnesium aluminum silicate* | | 10.0 | 10.0 | 10.0 | 10.0 |
| Sodium carboxymethyl cellulose | | 4.0 | 4.0 | 4.0 | 4.0 |
| Polyethylene oxide[1] | | 3.0 | 3.0 | 3.0 | 3.0 |

*Same as in Ex. 1-15
[1]Available from Union Carbide Corp. as Polyox WSRN 80.

Films were drawn on glass panels, air dried for seven days, water soaked and tested by rubbing with a cloth as described above. Light reflectance at 560 m$\mu$ were also recorded before and after water soak.

| Ex. No. | double finger rubs passed | light reflectance before soak | after soak | color change value (%) |
|---|---|---|---|---|
| 12 | >200 | 71.56 | 78.85 | 218 |
| 13 | 4 | 70.04 | 80.55 | 351 |

Additional panels were tested after air drying twelve days.

| Ex. No. | double finger rubs passed | light reflectance before soak | after soak | color change value (%) |
|---|---|---|---|---|
| 12 | >200 | 71.31 | 74.50 | 137 |
| 13 | >200 shows wear | 69.30 | 75.52 | 183 |
| 14 | >200 shows wear | 69.22 | 80.79 | 344 |
| 15 | >200 near failure | 68.76 | 80.83 | 408 |

Various other ingredients described hereinabove and varying amounts of the ingredients set forth above may be employed in place of the exemplified ingredients to obtain results within the scope of this invention. Likewise, the various exemplified procedures may be varied in practice.

According to the provisions of the Patent Statutes there is described, above, the invention and what are now considered its best embodiments. However, within the scope of the appended claims, it is to be understood that the invention may be practiced otherwise than as specifically described.

What is claimed is:
1. A curable composition, consisting essentially of:
   (a) an aqueous solution or dispersion of an alkali metal or quaternary ammonium silicate;
   (b) a cure promoting amount of a latent metal ion containing insolubilizing agent; and
   (c) a pigmentary hardener corresponding to the formula

   $$M_xM'_yO_z$$

where M is a divalent or trivalent metal ion, M' is a metal ion from Group III, IV or VIB of the Periodic Table of Elements, provided M and M' are not the same metal ion, x is 1 or 2, y is 1, 2 or 3 and z is an integer the value of which satisfies the oxidation state of the pigmentary hardener, wherein the amount of the pigmentary hardener ranges from about 1 part to about 300 parts based on 100 parts of the alkali metal or quaternary ammonium silicate solids.

2. The curable composition as in claim 1 where the silicate is selected from the group consisting of lithium silicate, potassium silicate, sodium silicate, quaternary ammonium silicate and mixtures thereof.

3. The composition as in claim 2 wherein M is selected from the group consisting of magnesium, calcium, strontium, barium, zinc, aluminum and ferric iron.

4. The composition as in claims 2 or 3 where M' is selected from the group consisting of boron, aluminum, silicon, tin, titanium, zirconium, chromium and molybdenum.

5. The composition as in claims 1 or 2 where the pigmentary hardener is selected from the group consisting of barium metaborate, calcium borate, calcium silicate, aluminum borate and mixtures thereof.

6. The composition as in claim 5 where the pigmentary hardener is barium metaborate.

7. The composition as in claim 1 where the amount of insolubilizing agent ranges from about 0.1 percent to about 5.0 percent based upon the combined weight of the alkali metal or quaternary ammonium silicate solids and insolubilizing agent.

8. The composition as in claim 7 where the insolubilizing agent is an alkali metal aluminate.

9. A coated article coated with a cured coating formed from the composition of claim 1.

10. A molded article formed from the composition of claim 1.

* * * * *